(12) United States Patent
Srinivasa et al.

(10) Patent No.: US 7,853,805 B1
(45) Date of Patent: Dec. 14, 2010

(54) ANTI-TAMPER SYSTEM

(75) Inventors: Narayan Srinivasa, Oak Park, CA (US); David Shu, West Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 986 days.

(21) Appl. No.: 11/702,449

(22) Filed: Feb. 2, 2007

(51) Int. Cl.
  G06F 11/30 (2006.01)
  G06F 12/14 (2006.01)
  H04K 1/00 (2006.01)
  H04L 9/00 (2006.01)
  H04L 9/28 (2006.01)

(52) U.S. Cl. .................... 713/194; 713/189; 713/193; 380/28

(58) Field of Classification Search ............... 713/189, 713/193; 380/28
  See application file for complete search history.

(56) References Cited

U.S. PATENT DOCUMENTS

| | | | |
|---|---|---|---|
| 6,678,646 B1 * | 1/2004 | McConnell et al. | 703/22 |
| 2006/0020822 A1 * | 1/2006 | Aigner et al. | 713/189 |
| 2007/0160196 A1 * | 7/2007 | Timmermans | 380/28 |
| 2007/0283311 A1 * | 12/2007 | Karoubalis et al. | 716/16 |

OTHER PUBLICATIONS

Lt. Col Arthur Huber—DoD, Acquisition Review Quarterly, Fall 1999, http://www.findarticles.com/p/articles/mi_m0JZX/is_4_6/ai_78177436/pg_2.

Adrian Thompson & Paul Layzell, "Analysis of Unconventional Evolved Electronics," Communications of the ACM, vol. 42, No. 4: pp. 71-79, Apr. 1999.

M. Sipper, et al., "Evolvable Systems: From Biology to hardware," Proc. Of 2nd International Conference, vol. 1478 of LCNS, Springer Verlag, 1998.

A. Thompson, "Hardware evolution: automatic design of electronic circuits in reconfigurable hardware by artificial evolution," Distinguished dissertation series, Springer Verlag, 1998.

R. A. Rutenbar, "Analog Design Automation: where are we? Where are we going?," In Proc. Of IEEE Custom Integrated Circuits Conference, pp. 13.1.1-13.1.8, 1993.

R. Thompson, et al., "Evolvable hardware for the generation of sequential filter circuits," eh, p. 17, NASA/DoD Conference on Evolvable Hardware (EH'02), 2002.

(Continued)

*Primary Examiner*—Shin-Hon Chen
(74) *Attorney, Agent, or Firm*—Tope-McKay & Assoc.

(57) ABSTRACT

The present invention relates to an anti-tamper system. The system comprises a circuit pathway having a unique, programmable, evolved chip in the pathway. The chip has logic units with transistors having fixed parameters. The chip has route lengths and connections between the logic units that are formed in an evolutionary formation of the chip such that the evolutionary formation changes the route lengths and connections between the logic units to create feedback and delay changes. The changes in the route lengths and connections cause the transistors to operate in intermediate analog states. In chip formation, a search and optimization algorithm explores, in a clock-less environment, various route lengths and connections such that the chip can behave in a desired fashion to provide a desired output for a given input. Through use of the evolved chip, the anti-tamper system provides a security benefit of utilizing a unique chip in its pathway.

20 Claims, 5 Drawing Sheets

OTHER PUBLICATIONS

A. Stoica, et al., "Evolvable Hardware for space applications," in Sipper, M., Mange, D., Perez-Uribe, A. (Eds.), Proc. 2nd Int. Conf. on Evolvable Systems: From Biology to Hardware, vol. 1478 of LNCS, Springer Verlag, pp. 166-173, 1998.

Hayworth, K., "The 'Modeling Clay' approach to bio-inspired electronic hardware," in Sipper, et al. (Eds.) Proc. 2nd Int. Conf. on Evolvable Systems: From Biology to Hardware, vol. 1478 of LNCS, Springer Verlag, pp. 248-255, 1998.

A. Hamilton, et al., "Palmo: Field programmable analogue and mixed-signal VLSI for evolvable hardware," in Sipper, M., Mange, D., Perez-Uribe, A. (Eds.), Proc. 2nd Int. Conf. on Evolvable Systems: From Biology to Hardware, vol. 1478 of LNCS, Springer Verlag, pp. 335-344, 1998.

P. Layzell, "The 'Evolvable Motherboard' A test platform for the research of intrinsic hardware evolution," Technical Report CSRP479, University of Sussex, UK, 1998.

National Bureau of Standards, "Data Encryption Standard," Federal Information Processing Standards Publication, vol. 46, Jan. 1977.

* cited by examiner

ANTI-TAMPER SYSTEM

FIELD OF INVENTION

The present invention relates to an anti-tamper system, and more particularly, to circuitry using unconventional electronics for use as an anti-tamper system.

BACKGROUND OF INVENTION

Securing sensitive computer systems and circuitry is often a necessity. When intercepted and otherwise compromised, the systems and circuitry can be decoded (reverse engineered) to provide others with sensitive information. A way to mitigate such risks is to use a relatively new set of technologies, inclusively known as "anti-tamper." Anti-tamper (AT) is defined as the systems engineering activities that are intended to prevent or delay exploitation of essential or critical technologies. The use of AT protective techniques varies depending on the technology being protected. For example, one area of technology vulnerability is in the electronics of a weapon system, where there are many critical technologies that can be compromised. Such techniques are used to delay reverse engineering and exploitation of critical algorithms, thereby slowing an adversary as much as possible in compromising U.S. technologies when they fall under enemy control.

According to the Department of Defense (DoD), an essential or critical technology is one that "if compromised would degrade combat effectiveness, shorten the expected combat-effective life of the system, or significantly alter program direction." In a scenario as shown in FIG. 1, if an unmanned aerial vehicle (UAV) 100 were to crash in enemy territory, then there is potential that the enemy could retrieve electronics that may contain very critical technology, such as the Operational Flight Plan (OFP). If the enemy where capable of reverse engineering the electronics to retrieve the OFP, it could force undesirable changes to tactics and concepts of operations (CONOPS), premature retirement of a weapons system, or major system design changes to regain some level of effectiveness. This in turn can result in serious damage to national security, endanger the warfighter, as well as result in expensive alternatives to remedy the situation, such as altering the OFP on all the remaining UAVs in a fleet. Thus, state-of-the-art technology of a critical nature typically requires more sophisticated AT applications. Some examples of AT techniques include software encryption, integrated circuit protective coatings, and hardware access denial systems.

Recent United States (U.S.) policy has encouraged the sale or transfer of certain military equipment to allied and friendly foreign governments. Increasingly, the equipment contains the latest in U.S. technological advances. Whereas in the past, where U.S. policy was relatively reluctant to permit such sales, the current cost-conscious environment motivates the leveraging of reduced unit prices that is afforded by increased production quantities. Additionally, the DoD is seeking increased foreign participation in acquisition programs from the requirements definition phase through production, fielding, and life-cycle management. While these efforts have the potential to enhance interoperability, increase standardization, reduce unit costs, and strengthen U.S. industry, they also risk making critical U.S. technologies vulnerable to possible exploitation. Thus, the goal of AT is to both inhibit exploitation and develop countermeasures against critical U.S. technologies.

A common AT technique is using a field-programmable gate array (FPGA). FPGA has an on-chip decryption tool that can be enabled to make the configuration bitstream secure. For example, a Xilinx user can encrypt the bitstream using Xilinx software. Xilinx is logic software that is produced by Xilinx, Inc., located at 2100 Logic Drive, San Jose, Calif. 95124. After encrypting the bitstream, the chip then performs the reverse operation, decrypting the incoming bitstream and internally recreating the intended configuration. However, the Differential Power Analysis (DPA) process described in literature reference no. 1 (which is a common method used to reverse engineer the key) could compromise the key, thus making the encrypted bitstream insecure and the embedded finite state machine (FSM) logic design accessible by an adversary.

Therefore, what is needed is a new technique to delay reverse-engineering and exploitation of automotive electronics, weapon system electronics, as well as commercial and other sensitive electronic systems. Thus, a continuing need exists for an anti-tamper system that (1) provides an additional means to protect an FSM design in the FPGA if the encrypted bitstream was compromised; (2) can generate different configuration bitstreams for each FPGA based on the same FSM design; and (3) hides part of the FSM design in the parasitics without explicit exposure by the configuration bitstreams.

SUMMARY OF INVENTION

The present invention relates to an anti-tamper system. The anti-tamper system comprises a circuit pathway having a programmable, evolved chip in the pathway. Through use of the evolved chip, the anti-tamper system provides a security benefit of utilizing a unique chip in its pathway.

The evolved chip has logic units with transistors, the transistors having fixed parameters. The evolved chip also has route lengths and connections between the logic units that are formed in an evolutionary formation of the chip such that the evolutionary formation changes the route lengths and connections between the logic units to create feedback and delay changes. The changes in the route lengths and connections cause the transistors to operate in intermediate analog states. In formation of the evolved chip, a search and optimization algorithm is used to explore, in a clock-less environment, various route lengths and connections such that the evolved chip can behave in a desired fashion to provide a desired output for a given input.

In another aspect, the search and optimization algorithm is an algorithm selected from a group consisting of genetic algorithm, particle swarm optimization, an evolutionary algorithm, and genetic programming.

Additionally, the present invention further comprises an encryption device in the circuit pathway. The encryption device is positioned in the pathway such that the encryption device is upstream from the evolved chip. The encryption device is configured to receive an encrypted signal and given a key, decrypt the signal to generate a decrypted signal. The evolved chip is configured to receive the decrypted signal and generate the desired output.

In another aspect, the encryption device is an evolved encryption device. In this aspect, the evolved encryption device has logic units with transistors, the transistors having fixed parameters. The encryption device has route lengths and connections between the logic units that are formed in an evolutionary formation of the encryption device such that the evolutionary formation changes the route lengths and connections between the logic units to create feedback and delay changes. The changes in the route lengths and connections cause the transistors to operate in intermediate analog states. In formation of the evolved encryption device, an evolutionary algorithm is used to explore, in a clock-less environment, various route lengths and connections such that the evolved encryption device can receive an unencrypted signal and generate an encrypted signal. Thus, the evolved chip is configured to receive the encrypted signal to generate the desired output.

Finally, as can be appreciated by one skilled in the art, the present invention also comprises a method for forming and use the anti-tamper system described herein. The methods comprise a plurality of acts to create and use the system described below.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
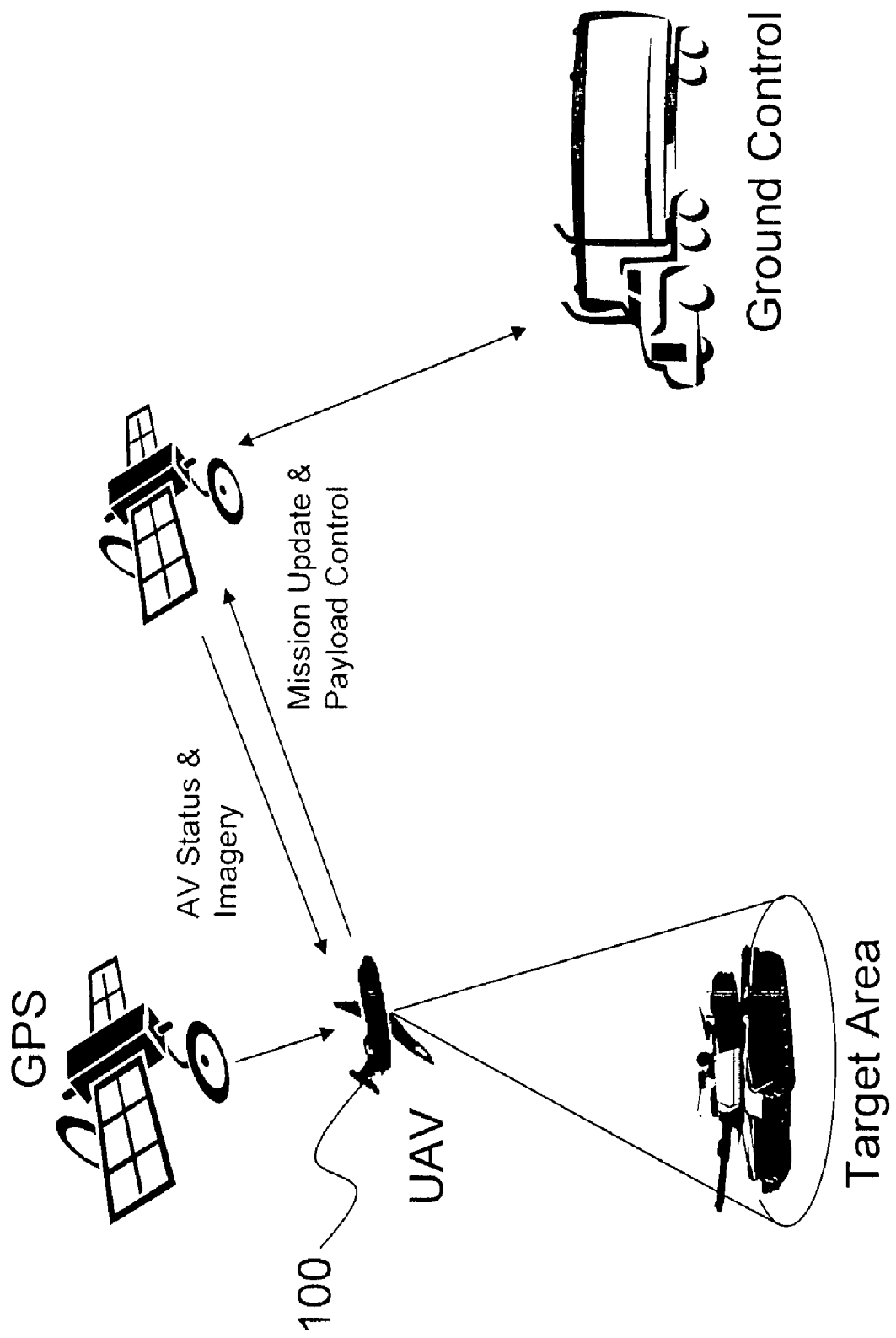
FIG. 1 is an illustration of an example scenario of communications and reconnaissance operations.

The present invention relates to an anti-tamper system, and more particularly, to circuitry using unconventional electronics for use as an anti-tamper system. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of various principal aspects of the present invention is provided. Subsequently, an introduction provides the reader with a general understanding of the present invention. Next, details of the present invention are provided to give an understanding of the specific aspects. Finally, a conclusion is provided as a synopsis of the present invention.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited herein by referring to the corresponding literature reference number.

1. Lt. Col Arthur Huber—DoD, "The Role And Nature Of Anti-Tamper Techniques In U.S. Defense Acquisition," *Acquisition Review Quarterly*, Fall 1999, taken from http://www.findarticles.com/p/articles/ml_m0JZX/is_4_6/ai_78177436/pg_2, on Nov. 28, 2006.
2. Adrian Thompson and Paul Layzell, "Analysis of Unconventional Evolved Electronics," COMMUNICATIONS OF THE ACM Vol. 42, No. 4: pp. 71-79, April 1999.
3. M. Sipper, D. Mange and A. Perez-Uribe, "Evolvable Systems: From Biology to hardware," Proc. of $2^{nd}$ International Conference, vol. 1478 of LCNS, Springer Verlag, 1998.
4. A. Thompson, "Hardware Evolution: Automatic design of electronic circuits in reconfigurable hardware by artificial evolution," Distinguished Dissertation Series, Springer-Verlag, 1998.
5. R. A. Rutenbar, "Analog Design Automation: Where are we? Where are we going?," In Proc. of IEEE Custom Integrated Circuits Conference, pp. 13.1.1-13.1.8, 1993.
6. Robert Thomson and Tughrul Arslan, "Evolvable Hardware for the Generation of Sequential Filter Circuits," eh, p. 17, NASA/DoD Conference on Evolvable Hardware (EH'02), 2002.
7. Stoica, A. et al., "Evolvable Hardware for Space Applications," In Sipper, M., Mange, D., Perez-Uribe, A. (Eds.). *Proc. $2^{nd}$ Int. Conf. on Evolvable Systems: From Biology to Hardware*, Vol. 1478 of LNCS. Springer-Verlag, pp. 166-173, 1998.
8. Hayworth, K., "The 'Modeling Clay' Approach to Bio-Inspired Electronic Hardware," In Sipper, M., Mange, D., Perez-Uribe, A. (Eds.). *Proc. $2^{nd}$ Int. Conf. on Evolvable Systems: From Biology to Hardware*, Vol. 1478 of LNCS. Springer-Verlag, pp. 248-255, 1998.
9. Hamilton, A., Papathanasiou, K., Tamplin, M., Brandtner, and T. "Palmo: Field Programmable Analogue and Mixed-Signal VLSI for Evolvable Hardware," In Sipper, M., Mange, D., Perez-Uribe, A. (Eds.). *Proc. $2^{nd}$ Int. Conf: on Evolvable Systems: From Biology to Hardware*, Vol. 1478 of LNCS. Springer-Verlag, pp. 335-344, 1998.
10. Layzell, P. "The 'Evolvable Motherboard' A Test Platform for the research of intrinsic Hardware Evolution," *Technical Report CSRP*4179, University of Sussex. UK. 1998.
11. National Bureau of Standards, "Data Encryption Standard," Federal Information Processing Standards Publication, vol. 46, January 1977.

12. P. Kocher, J. Jaffe, and B. Jun, "Introduction to Differential Power Analysis and Related Attacks," 1998, taken from http://www.cryptography.com/dpa/technical.
13. Jameco Electronics, "PC-Multiscope (part# 142834)," Catalog p. 103, February, 1999.

(2) PRINCIPAL ASPECTS

The present invention has two "principal" aspects. The first is an anti-tamper system. The anti-tamper system is typically in the form of circuitry that is incorporated into a larger computer system. The anti-tamper system may be incorporated into a wide variety of devices that provide different functionalities. The second principal aspect is a method, typically in the form of acts that are performed to create and/or use the anti-tamper system. These aspects will be described in more detail below.

(3) INTRODUCTION

The present invention is a new anti-tamper technique which denies an adversary access to details about a given finite state machine (FSM) using "Unconventional Evolved Electronics." The present invention is very effective in protecting the electronics of commercial as well as military systems. The present invention takes advantage of the variations in the manufacturing process of field-programmable gate arrays (FPGA) so that each undifferentiated FPGA still has distinct parasitic capacitance and inductance which can be used in an unconventional way for constructing the FSM. In this manner, the present invention decouples the explicit relationship between a FPGA configuration bitstream and its corresponding FSM. In other words, reverse engineering the configuration bitstream by an adversary will not assist in the retrieval of the FSM. Furthermore, it would also not do an adversary any good to configure other FPGAs using this same bitstream (because other FPGA would have different corresponding FSM due to unique parasitics).

The present invention improves upon the prior art by securing the embedded finite state machine (FSM) logic design, even if the encrypted bitstream is compromised. Thus, potential adversaries could not use an externally intercepted bitstream to analyze, or even to clone the design because the FSM logic design is based on a continuous-time, dynamic system (which is unique among FPGAs because the inherent parasitics present in each chip). A compromised cloned bitstream cannot be used to internally recreate the intended FSM design due to the variations of parasitic from one FPGA to another. Using evolutionary algorithms, the distinct parasitic can be configured/evolved to achieve the desired FSM logic design. Without the present invention, the compromised bitstream would have a higher chance to be cloned.

(4) DETAILS OF THE INVENTION

The present invention uses unconventional electronics in circuitry to create an anti-tamper system. For clarity, the following description will be separated into four sections: unconventional electronics; FPGA and evolution; encryption algorithms and differential power analysis; and the hybrid approach of the present invention.

(4.1) Unconventional Electronics

In recent years, several research groups have demonstrated the potential for artificial evolution to design electronic circuits automatically. Such groups have described their processes in literature reference nos. 2 through 20. When setting-out to evolve a circuit for some task, there is a fundamental decision to be made: whether the evolutionary process is free to explore any possible design, or whether it is constrained to encourage "sensible" circuits more like those arising from conventional design methods.

The constrained approach has the benefit of constraining the search space through which the evolution must navigate. It also provides a set of circuits that can be readily understood and thus utility of the final result. In other words, it is known that the circuits are likely to be "well-behaved" and amenable to analysis using established techniques.

When the evolution is not constrained, the circuits that are designed are referred to as "unconventional" designs: circuits with strange structures and intricate dynamic behaviors beyond the scope of conventional design and analysis. In this larger search space, there is a possibility of better solutions (provided that prejudices are set aside (based on existing design methods) of how an electronic circuit should behave). Furthermore, if the most promising application domains are the ones problematic for conventional design, then the exploration of new strategies is appropriate. The present invention uses unconventional circuit designs (also called unconventional electronics, as described by Adrian Thompson in literature reference no. 2) to develop novel encryption systems that are tamper proof because of their unique, non-duplicable design.

There are three key technical advancements that make the creation of unconventional electronics feasible. First is the rapid progress made in field-programmable gate array (FPGA) technology. There are several advantages that these devices (i.e., FPGAs) offer. For example, FPGA devices are rapidly reprogrammable and can therefore be used by evolutionary algorithms to rapidly explore various designs. Another advantage is that these are commercial off-the-shelf (COTS) systems that are continuously growing in size to the point where they can be purchased to design silicon on ceramic (SoC) on a single FPGA device. A non-limiting example of such a COTS system includes the Stratix which includes more than 10 million transistors. The Stratix II is developed by Altera Corporation, located 101 Innovation Drive, San Jose, Calif., 95134. The FPGA manufacturers, such as Xilinx and Altera, provide extensive software development tools that make the rapid design of unconventional circuits much easier than ever before.

The second key advancement is the rapid progress made in wafer manufacturing technology. Technology is rapidly migrating towards 90 nanometer (nm) and 65 nm wafers that provide improved yields and better economies of scale. This is synergistic with the development of FPGA technology because it should be possible to pack a lot more transistors into these devices and therefore be able to develop more complex circuitry on an FPGA. This will also drive down the cost of FPGAs.

The final advancement is in the area of evolutionary algorithms. Evolutionary algorithms are now computationally efficient and scalable to a point where it is feasible to apply an evolutionary algorithm for the evolution of large-scale designs.

(4.2) FPGA & Evolution

Figure 2:
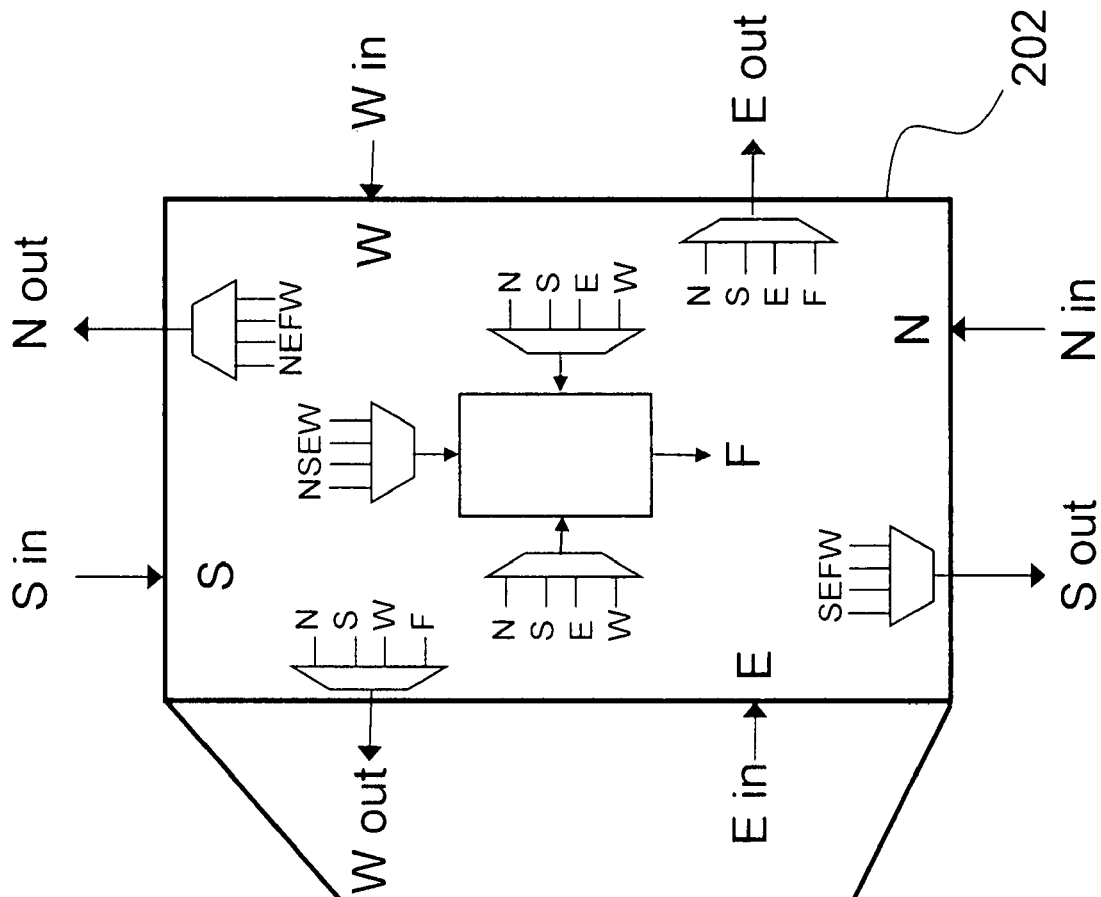
FIG. 2 is a schematic of a field-programmable gate array (FPGA), with an exploded view of a configurable logic block.
Figure 2:
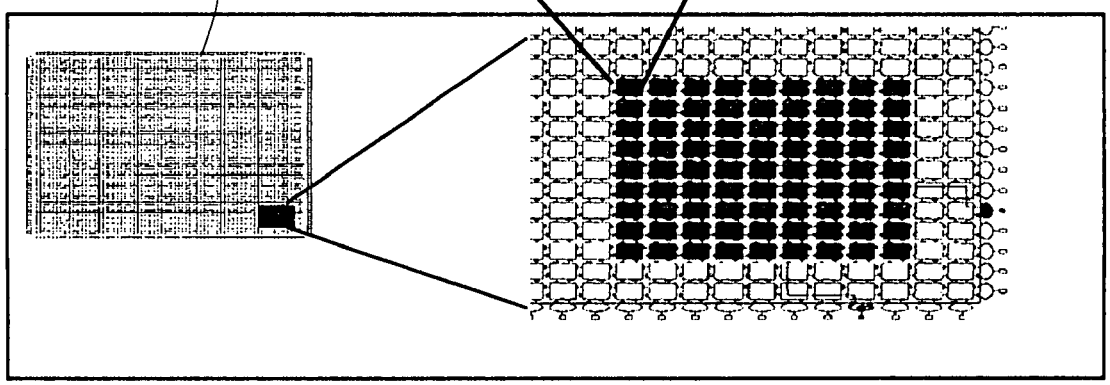

As shown in FIG. 2, the FPGA is a very large scale integration (VLSI) device 200 that consists of an uncommitted array of components, called the configurable logic block (CLB or cells) 202. Switches made from transistors control how each CLB/cell 202 behaves, aid how they are connected to each-other (with north, east, south, and west directional inputs being designated as N, E, S, and W, respectively). The CLB/cell 202 performs a function (F) of taking all the respective inputs and performing a Boolean operation on the inputs. The settings of these switches are controlled by the contents of the random-access memory (RAM) bits distributed throughout the chip (also known as the configuration bitstream); this memory can be rapidly and repeatedly written to by a host microprocessor. This process of writing causes a vast number of possible electronic circuits to be physically instantiated in silicon. The writing process is controlled by an evolutionary algorithm that resides in the microprocessor. Thus, the FPGA is ideally suited for evolving circuits.

The evolutionary algorithm is implemented within the microprocessor as a computer program that mimics Darwinian evolution: small random variations (or mutations) are repeatedly made to one or more candidate circuit designs. Natural selection is replaced by a 'fitness' measure of the degree to which a circuit meets the target engineering specifications, such as behavior, size, power consumption, etc. Mutations resulting in poorer fitness measurements are rejected, whereas those producing an improvement (or no improvement) are allowed to persist and are built upon in further rounds of variation and selection.

(4.3) Encryption Algorithms and Differential Power Analysis

A goal of the present invention is to design robust anti-tamper encryption systems. This section provides a description of the state-of-the-art ideas on encryption and the techniques for tampering with these systems. Such descriptions provide the background information that is necessary for an understanding of the present invention. The most common standard for encryption is the data encryption standard (DES), as described in literature reference no. 11. The DES cryptography implementation has an encryption algorithm and an encryption key. The algorithm is fixed while the key varies between each user. In order to make the system functional, both the encryption algorithm and key are required. The DES key schedule computation involves rotating 28-bit key registers. DES implementations perform a variety of bit permutations on the key based on conditional branching, memory comparisons, multipliers, and exponentiators. In real-world environments, computers and microchips that use these encryption algorithms leak information about the operations they process primarily in the form of electromagnetic radiation.

Recently, a technique called differential power analysis (or DPA) has been developed to exploit this leakage (as described in literature reference no. 12). In particular, the DPA approach is designed to measure a circuit's power consumption collected during cryptographic operations and analyze it in such a way that yields information about the device's operation as well as the encryption key. The process of measuring the power consumption is readily available in the market, with sampling capabilities of over 20 megahertz (MHz) with a cost of just over $400 in 2006 (as described in literature reference no. 13). This makes current devices very vulnerable to attacks by an enemy, even those enemies with limited resources.

(4.4) Hybrid Approach of the Present Invention

An objective of the present invention is to design and analyze the effectiveness of the invention's anti-tamper techniques/technologies to protect critical components. The focus is on denying an adversary access to details about the finite state machine (FSM). This FSM could be a complex circuit; for example, an operational flight program (OH) implemented using field-programmable gate arrays (FPGAs). Given a conventionally designed FPGA, if the adversary were able to recover the FPGA's configuration bitstream (e.g., due to the UAV's engine malfunction), the enemy's electronic countermeasures (ECM) system could be easily updated to defeat a missile coming from a similar UAV. The major shortcoming of conventionally designed FPGAs is that the decrypted configuration bitstream is cloned by every device (e.g., missile) in the inventory using the same encryption standard. If the adversary were able to crack the key for just one device (e.g., missile), it is possible to decrypt every device in the inventory. To compensate the cloning effect, the present invention applies unconventional electronics techniques to design circuits that are tamper-proof and that cannot be cloned or compromised.

In a digital system, there is general clock that sets the pace. The components of the digital circuit perform Boolean functions and consist of transistors that behave as a high-gain component (which, for most inputs, saturates the output rapidly, either fully-high or fully-low). The digital system follows a rigid logic structure that connects these components in a fixed manner, thus forming a FSM. If certain design rules are followed, then the system's behavior can be abstracted to a binary description: a digital logic function. In an analog system, no general clock is required and transistors operate as real-time devices (in the linear range). These systems have a freedom of settings in their device parameters and connectivity and are thus more flexible than digital systems. In an unconventional circuit design task, circuits are evolved on an FPGA platform which is designed for digital designs. However, unlike digital designs, no clock is provided and no constraints are placed on the circuit structure or dynamic behavior. In other words, an evolutionary algorithm is used to create the chip through an evolutionary formation. Thus, the evolutionary algorithm essentially explores the space of continuous-time dynamic systems. Evolution is therefore free to explore the full repertoire of the FPGA's possible behaviors, of which digital systems constitute but a small subset. Here the transistor parameters are fixed. However, the evolutionary process can change the route lengths and connections between the logic units to create feedback and delay changes. Feedback is, for example, when an output from the CLB indirectly returns as an input (creating a feedback loop). Due to the feedback loop (or a fictitious delay loop), the signal is delayed which results in a delay change. These changes make the switches operate in intermediate analog states. The role of the evolutionary algorithm is to explore various route lengths and connections such that the evolved continuous-time dynamic system can behave in a desired fashion to provide the correct output for a given input (i.e., to realize the correct transfer function).

As described in literature reference no. 2, a study was conducted by Adrian
Thompson that provides the necessary evidence for FPGA behavior after evolution as a continuous-time dynamical system (hereinafter referred to as the "Thompson study"). The Thompson study serves as a feasibility study for the present invention. In the Thompson study, the task was to evolve a circuit that could differentiate between 1 kilohertz (kHz) and 10 kHz audio tones, producing a steady high output whenever one tone was present at the input and a steady low for the other. Evolution was performed on a Xilinx XC6216 FPGA and the evolution process was allowed to exploit the capabilities of the FPGA as freely as possible. Each candidate design for the evolved circuit was a setting of the configuration bitstream for a 10×10 corner of the chip. A fitness score for each design configured on the FPGA during the process of evolution was computed. The task essentially was to see if the dynamics of the FPGA (governed by transistors switching in the nanoseconds time range) could be organized to give an orderly behavior on a very different timescale: the periods of the two tones to be distinguished are 1 millisecond (ms) and 0.1 ms.

Figure 3:
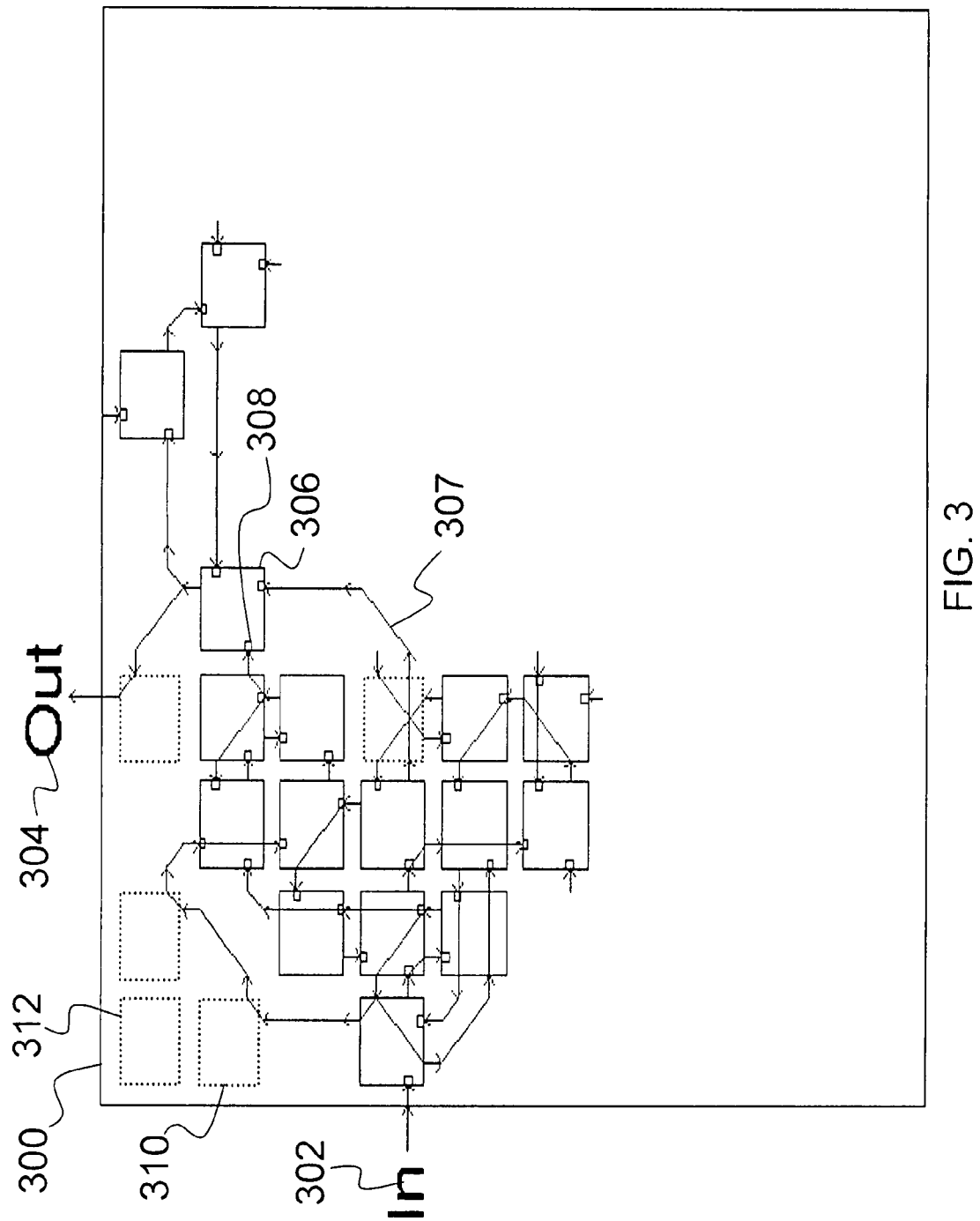
FIG. 3 is an illustration of an example evolved circuit for discrimination of tones of 1 kilohertz (kHz) and 10 kHz.

The experiment conducted in the Thompson study was successful and the resulting circuit is shown in FIG. 3. FIG. 3 illustrates an example of an evolved circuit 300 for discrimination of tones 1 kHz and 10 kHz. The "In" 302 marks the input from external source (the audio tones) and "Out" 304 the point where the circuit 300 response was measured. The circuit 300 was found to have very unusual dynamics and structure; it can be seen to have two types of cells. The regular cells 306 are depicted as having solid lines. It can be observed from the circuit 300 that these cells 306 have signals 307 arriving from neighboring cells and they use these as inputs, as marked with small boxes 308 to influence the cells' functional role.

The other cells 310, depicted as having dotted lines, were more interesting. These other cells 310 did not have any functional role (in the Boolean sense) to play but simply served as pathways to the circuit 300. In fact, the top-left cell 312 did not even have a connection to the circuit 300. However, the performance of the circuit 300 deteriorated if any of these other cells 310 were not included in the circuit 300. A thorough analysis in the Thompson study showed that the continuous time aspect of the circuit played an important role. Also, it was found that if the circuit was configured onto a different, but nominally identical, FPGA chip (not used in the evolution), then its performance was degraded. This behavior was attributed to the variations in the manufacturing process of FPGA. Each undifferentiated FPGA still has distinct parasitic capacitance and inductance which is exploited by the evolution process in an unconventional manner via the loops or pathways (other cells 310) to realize the dynamic system of interest. Note that parasitics affect the phase information in the dynamics. Just as an imaginary part of a complex number can provide useful phase information, the states/transition path provided by distinct parasitics can be an integral part of the circuit. Analysis about the effects of temperature showed that the circuit still works if the temperature was lowered or raised, but the frequency between which the discrimination occurs was raised or lowered. This distinct nature of each evolved circuit forms the basis for the present invention. Thus, the present invention expands upon the prior art by using the circuitry described above for use in an anti-tamper system.

Figure 4:
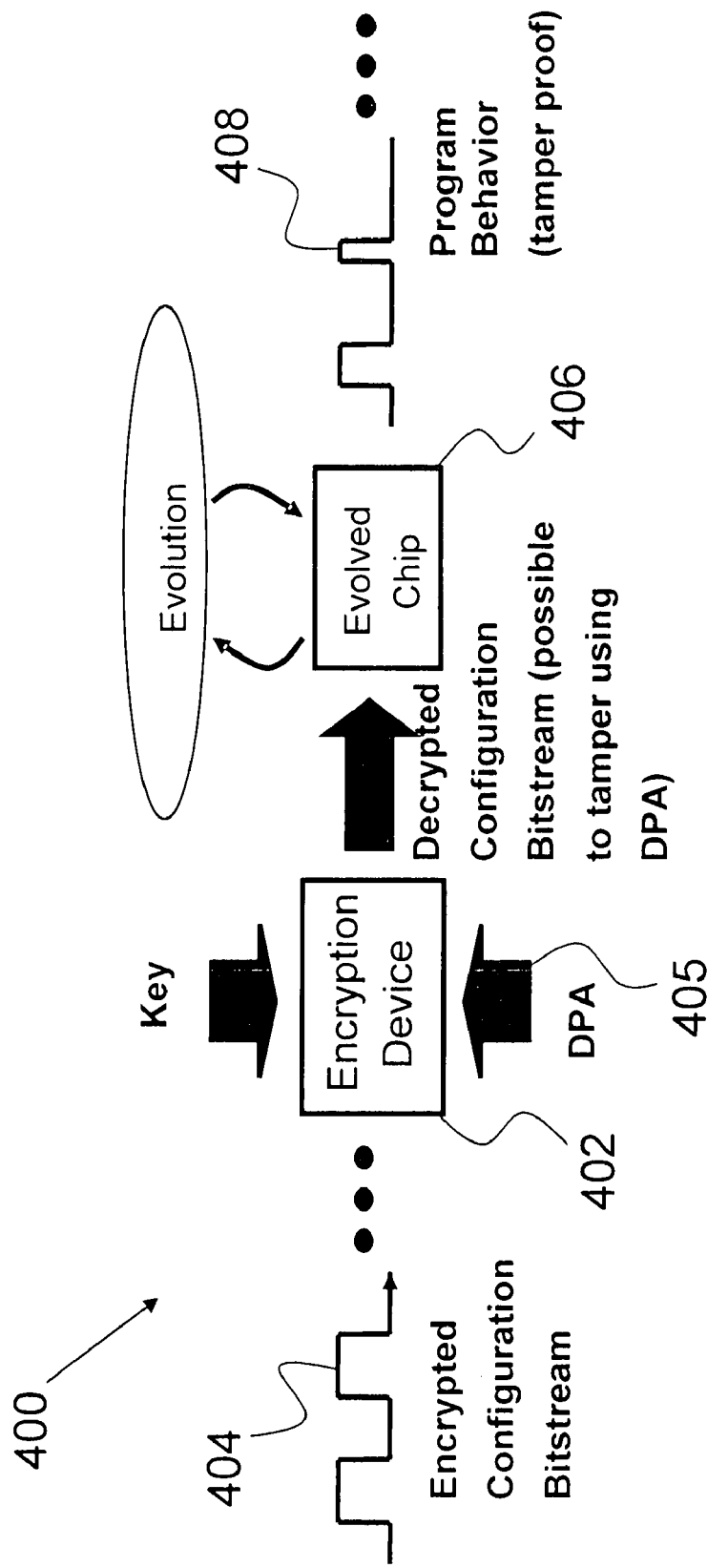
FIG. 4 is a flow chart illustrating operations of an anti-tamper system according to the present invention.

There are at least two possible anti-tamper systems that can be designed using unconventional electronics circuitry. In the first system, the circuit or critical technology is designed to be protected around two levels of encryption, as shown in FIG. 4. As shown in FIG. 4, the anti-tamper system 400 uses an existing encryption device 402 as the first level of defense (using an encryption algorithm). The encryption device 402 is used with the configuration bitstream such that it can transform the hardware to perform like an OFP or other desired program. The configuration bitstream is received as an encrypted configuration bitstream 404 that is decrypted by the encryption device 402. However, the encryption device 402 alone is not adequate protection because of its vulnerability to DPA 405, as described earlier. The encryption device 402 is combined with an evolved FPGA chip 406, with the encryption device 402 being upstream from the evolved FPGA chip 406. Meaning that a signal passes through the encryption device 402 before passing through the evolved FPGA chip 406.

In the present invention, the critical technology that is to be protected (as a non-limiting example, the circuit that generates the OFP) can be evolved separately on an FPGA chip to create the evolved FPGA chip 406. The evolved FPGA chip 406 is created using a search and optimization algorithm as described above by the Thompson study (see literature reference no. 2, which is incorporated herein by reference). This process will create a chip-specific continuous dynamic system that exploits the parasitics of the FPGA to generate the desired program 408 (e.g., the OFP) given the correct configuration bitstream. The search and optimization algorithm is any algorithm that can be used to optimize the desired parameters of the chip, non-limiting examples of which include a genetic algorithm, particle swarm optimization, an evolutionary algorithm, and genetic programming.

There are two levels of protection here. The first is that the configuration bitstream will be unique for each evolved FPGA chip 406 and therefore cannot be duplicated across other chips, and the second is that the evolved system is a dynamic system. The dynamic system cannot be deciphered from the given digital FPGA system because of the extra pathways that the evolution creates. Furthermore, the extra pathways cannot be seen from outside measurements. This makes reverse engineering very hard if not impossible to perform. Due to the exploitation of the parasitics within the evolved FPGA chip 406, the circuit will be unique for each evolved FPGA chip 406 and therefore will not compromise an entire operation if an adversary were to obtain one of the evolved FPGA chips 406 that generate the program (e.g., OFP).

Figure 5:
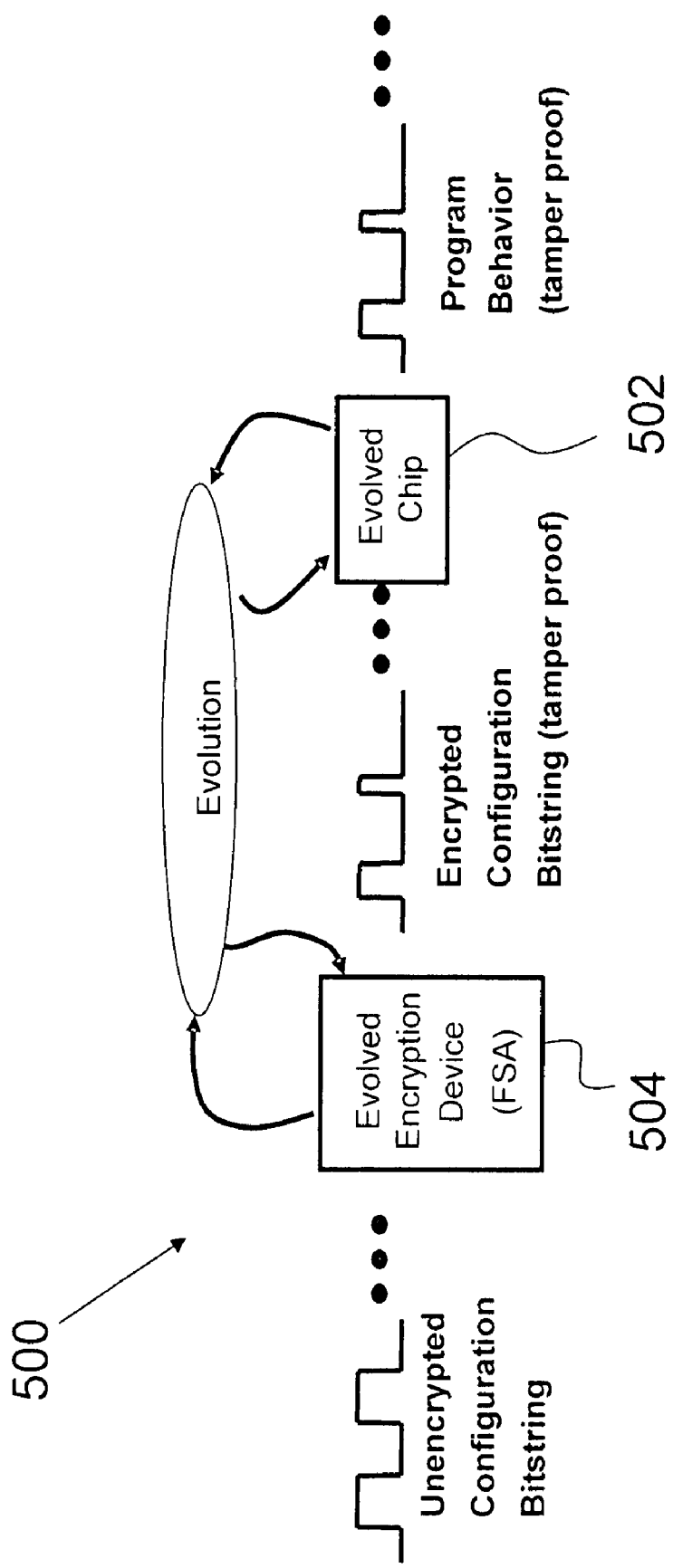
FIG. 5 is a flow chart illustrating operations of an anti-tamper system according to the present invention.

As shown in FIG. 5, the present invention can be expanded to provide the same two levels of protection. However, in this case, the anti-tamper system 500 includes a circuit pathway that has both an evolved chip 502 and an evolved encryption device 504. The encryption is performed using evolution, such that the encryption device is an evolved encryption device 504. This obviates the need for either following an encryption standard, such as DES or using a key. In this aspect, the evolved encryption device 504 is used in conjunction with an evolved chip 502. This makes the hardware a lot harder to tamper with because of the "hidden" states of the chip that are specific to each chip.

An additional feature that can be exploited is that these systems can be periodically re-evolved. For example, in a complex circuit such as an OFP generator, sub-blocks on the FPGA can be randomly selected with the sub-blocks being evolved to mimic what they were doing within the OFP before evolution. If re-evolved, the sub-blocks can be changed to alter the dynamics of the circuit. This will add an additional level of protection to the system and make tampering virtually impossible.

(5) CONCLUSION

The present invention is an anti-tamper system. The system comprises a circuit pathway having a unique, programmable, evolved chip in the pathway. The chip is unique in that once evolved, it is very unlikely that any other chip will ever be the same. The chip has logic units with transistors (having fixed parameters). The chip has route lengths and connections between the logic units that are evolved in an evolutionary formation of the chip. The evolutionary formation changes the route lengths and connections between the logic units to create feedback and delay changes. The changes in the route lengths and connections cause the transistors to operate in intermediate analog states. In formation of the chip, a search and optimization algorithm explores, in a clock-less environment, various route lengths and connections such that the chip can behave in a desired fashion to provide a desired output for a given input.

The system also includes an encryption device in its pathway. The encryption device can be either a standard encryption device or an evolved encryption device (using the evolution method described above). Through use of the evolved chip and encryption device, the anti-tamper system provides a security benefit of utilizing a unique, non-reproducible chip in its pathway.

The anti-tamper system of the present invention provides many benefits over the prior art. Such benefits include duplication prevention, robust encryption, protection against Trojan horses, failure, and continuous protection.

(5.1) Duplication Prevention

Applying unconventional electronics to evolve circuits, the evolved circuits are designed as a continuous-time dynamic system. This implies that each circuit exploits the semiconductor physics to extract pathways that help it satisfy the design goals on a digital circuit. These pathways have parasitics that are unique at the basic material level and hence provides a unique circuit on each FPGA chip. This feature can be exploited to prevent an adversary from understanding and hence duplicating, the critical circuits.

(5.2) Robust Encryption

Unconventional electronics are used to devise robust encryption systems because no key, or encryption standard, is used during the evolution process. Hence, DPA techniques cannot be used to reverse engineer the key for the same reason.

(5.3) Protection Against Trojan Horses and Failure

The circuits manufactured abroad can be evolved using evolution algorithms. Here, the idea is to select a subset of the digital circuit and convert it into a continuous-time dynamic system. This will modify the way the circuit realizes its transfer function, contrary to an adversary's understanding of the way the circuit works. This will prevent an adversary from making reliable measurements for monitoring critical circuits. It may also help in mitigating failure mechanisms designed into the circuit because the behavior of the circuit has been changed. Thus, the pre-engineered design to create failure may be corrupted by the unconventional design.

(5.4) Continuous Protection

Protection mechanisms can be changed by reconfiguring the FPGA design of both encryption circuits and critical silicon on ceramic (SoC). This can be achieved by taking the original digital implementation of the FPGA behavior as the baseline and selecting a different subset of the circuit to perform an unconstrained evolution on it. This results in a continually adaptive circuit that can change the way it realizes the same transfer function and thus makes it virtually impossible to tamper with the system.

What is claimed is:

1. An anti-tamper system, comprising:
   a circuit pathway having a unique, programmable evolved chip in the pathway; and
   wherein the evolved chip has logic units with transistors, the transistors having fixed parameters, and the evolved chip having route lengths and connections between the logic units that are formed in an evolutionary formation of the chip such that the evolutionary formation changes the route lengths and connections between the logic units to create feedback and delay changes, with the changes in the route lengths and connections causing the transistors to operate in intermediate analog states, where in formation of the evolved chip, a search and optimization algorithm is used to explore, in a clock-less environment, various route lengths and connections such that the evolved chip can realize a transfer function by producing an output for a given programmed input, whereby through use of the evolved chip, the anti-tamper system provides a security benefit of utilizing a unique chip in its pathway.

2. An anti-tamper system as set forth in claim 1, wherein the search and optimization algorithm is an algorithm selected from a group consisting of a genetic algorithm, particle swarm optimization, an evolutionary algorithm, and genetic programming.

3. An anti-tamper system as set forth in claim 2, further comprising an encryption device in the circuit pathway, the encryption device being positioned in the pathway such that the encryption device is upstream from the evolved chip.

4. An anti-tamper system as set forth in claim 3, wherein the encryption device is configured to receive an encrypted signal and given a key, decrypt the signal to generate a decrypted signal, and where the evolved chip is configured to receive the decrypted signal and generate the desired output.

5. An anti-tamper system as set forth in claim 4, wherein the encryption device is an evolved encryption device.

6. An anti-tamper system as set forth in claim 5, wherein the evolved encryption device has logic units with transistors, the transistors having fixed parameters, and the encryption device having route lengths and connections between the logic units that are formed in an evolutionary formation of the encryption device such that the evolutionary formation changes the route lengths and connections between the logic units to create feedback and delay changes, with the changes in the route lengths and connections causing the transistors to operate in intermediate analog states, where in formation of the evolved encryption device, an evolutionary algorithm is used to explore, in a clock-less environment, various route lengths and connections such that the evolved encryption device can receive an unencrypted signal and generate an encrypted signal, and where the evolved chip is configured to receive the encrypted signal to generate the desired output.

7. An anti-tamper system as set forth in claim 1, further comprising an encryption device in the circuit pathway, the encryption device being positioned in the pathway such that the encryption device is upstream from the evolved chip.

8. An anti-tamper system as set forth in claim 7, wherein the encryption device is configured to receive an encrypted signal and given a key, decrypt the signal to generate a decrypted signal, and where the evolved chip is configured to receive the decrypted signal and generate the desired output.

9. An anti-tamper system as set forth in claim 7, wherein the encryption device is an evolved encryption device.

10. An anti-tamper system as set forth in claim 9, wherein the evolved encryption device has logic units with transistors, the transistors having fixed parameters, and the encryption device having route lengths and connections between the logic units that are formed in an evolutionary formation of the encryption device such that the evolutionary formation changes the route lengths and connections between the logic units to create feedback and delay changes, with the changes in the route lengths and connections causing the transistors to operate in intermediate analog states, where in formation, an evolutionary algorithm is used to explore, in a clock-less environment, various route lengths and connections such that the evolved encryption device can receive an unencrypted signal and generate an encrypted signal, and where the evolved chip is configured to receive the encrypted signal to generate the desired output.

11. A method for forming an anti-tamper system, comprising acts of:

evolving a chip to create a unique, programmable evolved chip; and positioning the evolved chip in a circuit pathway;

wherein in the act of evolving a chip to create a programmable, evolved chip, the evolved chip has logic units with transistors, the transistors having fixed parameters, and the evolved chip having route lengths and connections between the logic units that are formed in evolving the chip such that the route lengths and connections between the logic units are changed to create feedback and delay changes, with the changes in the route lengths and connections causing the transistors to operate in intermediate analog states; and using a search and optimization algorithm to explore, in a clock-less environment, various route lengths and connections such that the evolved chip can realize a transfer function by producing an output for a given programmed input, whereby through use of the evolved chip, the anti-tamper system provides a security benefit of utilizing a unique chip in its pathway.

12. A method as set forth in claim 11, further comprising an act of selecting the search and optimization algorithm from a group consisting of a genetic algorithm, particle swarm optimization, an evolutionary algorithm, and genetic programming.

13. A method as set forth in claim 12, further comprising an act of positioning an encryption device in the circuit pathway, the encryption device being positioned in the pathway such that the encryption device is upstream from the evolved chip.

14. A method as set forth in claim 13, further comprising an act of configuring the encryption device to receive an encrypted signal and given a key, decrypt the signal to generate a decrypted signal, and where the evolved chip is configured to receive the decrypted signal and generate the desired output.

15. A method as set forth in claim 14, further comprising an act of evolving the encryption device to form an evolved encryption device.

16. A method as set forth in claim 15, wherein in the act of evolving the encryption device to form an evolved encryption device, the evolved encryption device has logic units with transistors, the transistors having fixed parameters, and the encryption device having route lengths and connections between the logic units that are formed in evolving the encryption device such that the route lengths and connections between the logic units are changed to create feedback and delay changes, with the changes in the route lengths and connections causing the transistors to operate in intermediate analog states; and further comprising an act of using an evolutionary algorithm to explore, in a clock-less environment, various route lengths and connections such that the evolved encryption device can receive an unencrypted signal and generate an encrypted signal, and where the evolved chip is configured to receive the encrypted signal to generate the desired output.

17. A method as set forth in claim 11, further comprising an act of positioning an encryption device in the circuit pathway, the encryption device being positioned in the pathway such that the encryption device is upstream from the evolved chip.

18. A method as set forth in claim 17, further comprising an act of configuring the encryption device to receive an encrypted signal and given a key, decrypt the signal to generate a decrypted signal, and where the evolved chip is configured to receive the decrypted signal and generate the desired output.

19. A method as set forth in claim 17, further comprising an act of evolving the encryption device to form an evolved encryption device.

20. A method as set forth in claim 19, wherein in the act of evolving the encryption device to form an evolved encryption device, the evolved encryption device has logic units with transistors, the transistors having fixed parameters, and the encryption device having route lengths and connections between the logic units that are formed in evolving the encryption device such that the route lengths and connections between the logic units are changed to create feedback and delay changes, with the changes in the route lengths and connections causing the transistors to operate in intermediate analog states; and further comprising an act of using an evolutionary algorithm to explore, in a clock-less environment, various route lengths and connections such that the evolved encryption device can receive an unencrypted signal and generate an encrypted signal, and where the evolved chip is configured to receive the encrypted signal to generate the desired output.

* * * * *